United States Patent
Picard

(10) Patent No.: US 9,134,900 B2
(45) Date of Patent: Sep. 15, 2015

(54) TRAVERSAL OF A SOFT BAR TO UNLOCK AN APPLICATION

(75) Inventor: Jean-Charles Picard, Villeneuve Loubet (FR)

(73) Assignee: QUALCOMM Incorporated, San Diego, CA (US)

( * ) Notice: Subject to any disclaimer, the term of this patent is extended or adjusted under 35 U.S.C. 154(b) by 877 days.

(21) Appl. No.: 13/352,340

(22) Filed: Jan. 18, 2012

(65) Prior Publication Data

US 2013/0185788 A1 Jul. 18, 2013

(51) Int. Cl.
*G06F 3/0488* (2013.01)
*G06F 21/00* (2013.01)

(52) U.S. Cl.
CPC .......... *G06F 3/04883* (2013.01); *G06F 21/00* (2013.01); *G06F 2200/1637* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,805,161 A * | 9/1998 | Tiphane | | 715/786 |
| 7,593,000 B1 * | 9/2009 | Chin | | 345/156 |
| 8,127,141 B2 * | 2/2012 | Hypponen | | 713/184 |
| 8,504,842 B1 * | 8/2013 | Meacham | | 713/183 |
| 2009/0006991 A1 * | 1/2009 | Lindberg et al. | | 715/763 |
| 2009/0058830 A1 * | 3/2009 | Herz et al. | | 345/173 |
| 2009/0307768 A1 | 12/2009 | Zhang et al. | | |
| 2010/0123724 A1 * | 5/2010 | Moore et al. | | 345/473 |
| 2010/0197352 A1 * | 8/2010 | Runstedler et al. | | 455/566 |
| 2010/0235746 A1 * | 9/2010 | Anzures | | 715/723 |
| 2011/0041102 A1 * | 2/2011 | Kim | | 715/863 |
| 2011/0109561 A1 * | 5/2011 | Lee et al. | | 345/173 |
| 2011/0148572 A1 | 6/2011 | Ku | | |
| 2011/0260829 A1 * | 10/2011 | Lee | | 340/5.51 |
| 2012/0274662 A1 * | 11/2012 | Kim et al. | | 345/650 |
| 2013/0201136 A1 * | 8/2013 | Baard et al. | | 345/173 |
| 2013/0328793 A1 * | 12/2013 | Chowdhury | | 345/173 |
| 2014/0283009 A1 * | 9/2014 | Hsueh et al. | | 726/18 |
| 2014/0317759 A1 * | 10/2014 | Lee et al. | | 726/28 |

FOREIGN PATENT DOCUMENTS

EP 2381384 A1 10/2011
WO WO-2011073213 A1 6/2011

OTHER PUBLICATIONS

Android Style Unlock Screen Pattern for Jailbroken Iphone.

* cited by examiner

*Primary Examiner* — Taghi Arani
*Assistant Examiner* — Phy Anh Vu
(74) *Attorney, Agent, or Firm* — Kilpatrick Townsend Stockton LLP

(57) ABSTRACT

Illustrated is a system and method to receiving input at a soft bar, the input received at a middle position on the soft bar equal distance from a first position and a second position on the soft bar. The system and method also including a traversing of the soft bar from the middle position to one of the first or second position, using the input, a plurality of times to generate a candidate password, each traversal to generate a position value that is part of the candidate password. Further, the system and method to include unlocking a Graphical User Interface (GUI) for use, the unlocking to occur where the candidate password is equivalent to a stored password.

13 Claims, 16 Drawing Sheets

TRAVERSAL OF A SOFT BAR TO UNLOCK AN APPLICATION

BACKGROUND

Various multifactor authentication regimes have been developed to control access to mobile computing devices. These regimes commonly use an alphanumeric password as one of the factors to authenticate a potential user of a mobile computing device. More recently, certain pattern based authentication regimes have been developed whereby a pattern is traced onto a Graphical User interface (GUI) of a mobile computing device. ANDROIDLOCK™, that is part of the Cydia application installer, is one example of such a pattern based authentication regime. A further example of such a pattern based authentication is provided in the form of a PICTORIAL LOGIN™ feature that is part of Microsoft Windows 8.

BRIEF DESCRIPTION OF THE DRAWINGS

Some embodiments of the invention are described, by way of example, with respect to the following figures.

DETAILED DESCRIPTION

Illustrated is a system and method to for controlling access to a mobile computing device through the use of a sequence of inputs to positions on a software ("soft") input bar. In one example embodiment, input is a signal generated by a touch sensitive display through the use of a stylus or a finger applied to a touch sensitive display of the mobile computing device. For the purposes of illustration only, a finger is shown herein. In another example embodiment, input is a signal generated by an accelerometer or gyroscope denoting the tilting of the mobile device (e.g., the form factor casing associated with the mobile computing device) to a particular orientation (e.g., left or right). The sequence of inputs, as used herein, is a traversing of the soft bar using one or more of the above mentioned inputs. Further, as will be discussed in more detail below, where input is provided via the accelerometer a soft icon representing a period of time during which this tilting has occurred may used to illustrate the transversal of the soft bar. Traversing, as used herein, includes the generation of input via movement from a first pixel position to a second pixel position, where the first and second pixel positions reside on the soft bar and are adjacent. This traversing terminates at the particular position on the soft bar (e.g., left position or right position).

As is illustrated in below, in instances where traversing terminates, a position value is retrieved and made part of a password sequence. In one example embodiment, this password sequence is a candidate password that is compared against a stored password. Where a match exists between the candidate and stored passwords, access to the GUI of the mobile computing device is granted (i.e., the GUI is unlocked and access to the applications residing on the mobile computing device granted). In another example embodiment, this candidate password is stored for future use as a stored password used to control access to the mobile computing device. The candidate password may have eight (8) or more character and be generated using eight (8) or more traversals of the soft bar.

Figure 1:
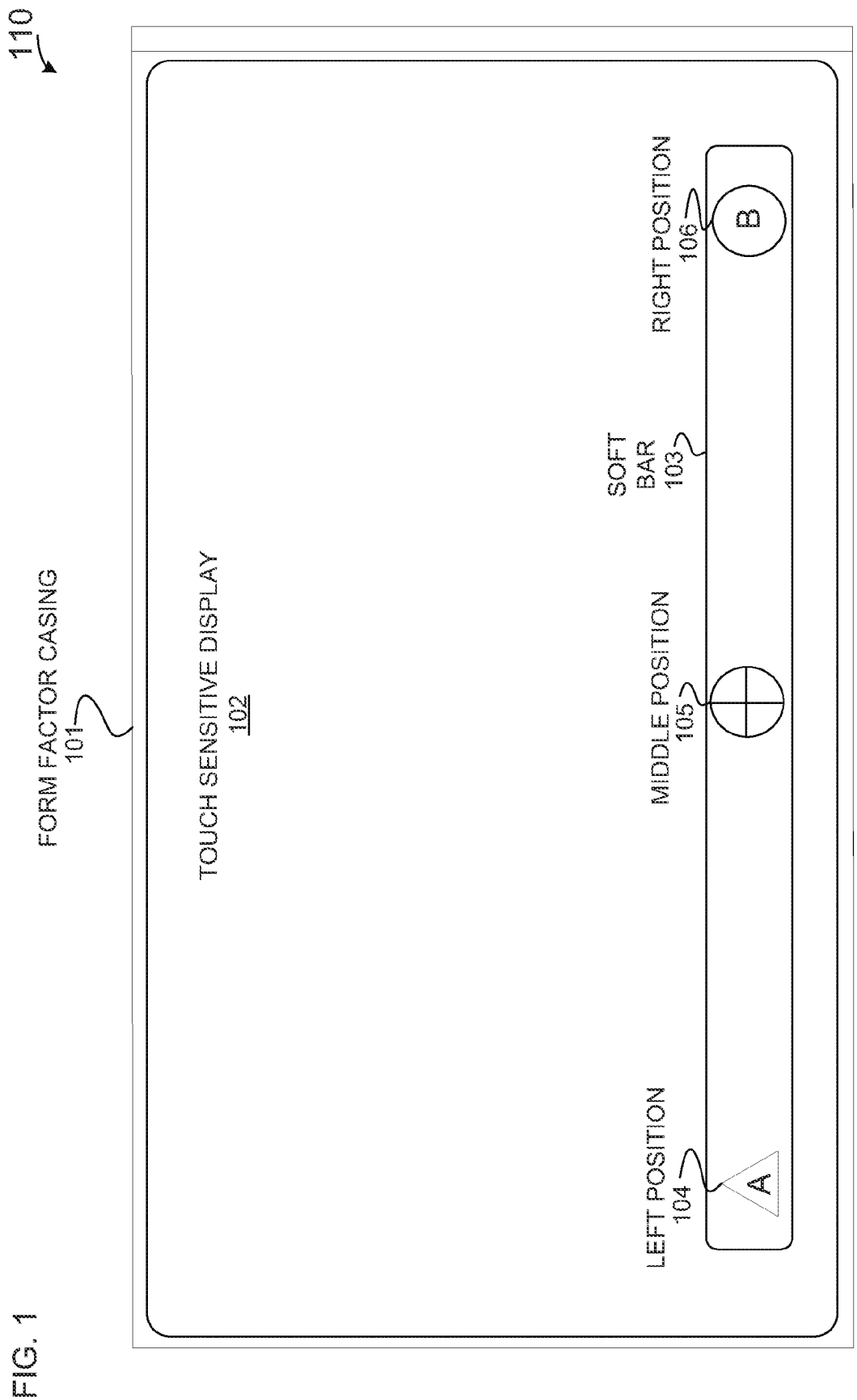
FIG. 1 illustrates a mobile computing device, according to an example embodiment, where access to this mobile computing device is controlled through the use of a sequence of input to positions on a soft bar.

FIG. 1 illustrates one example embodiment of a mobile computing device 110 where access to this mobile computing device is controlled through the use of a sequence of input to positions on a soft bar. As shown, this mobile computing device 110 includes a touch-sensitive display 102. The mobile computing device 110 may be a tablet device, smart phone, portable computer, or other suitable computing device capable of wireless connectivity over a voice or data network. The display 102 of the mobile computing device 110 is, for example, a 240×240, a 320×320, a 320×480, or a 640×480 touch sensitive (including gestures) display screen. The display 102 can be structured from, for example, such as glass, plastic, thin-film or composite material. In one embodiment the screen may be 1.5 inches to 9.7 inches (or 4 centimeters to 25 centimeters) diagonally. The touch sensitive display may be a transflective liquid crystal display (LCD) screen. In alternative embodiments, the aspect ratios and resolution may be different without departing from the principles of the inventive features disclosed within the description. By way of example, embodiments of the display 102 comprises an active matrix liquid crystal display (AMLCD), a thin-film transistor liquid crystal display (TFT-LCD), an organic light emitting diode (OLED), an Active-matrix OLED (AMOLED), an interferometric modulator display (IMOD), a liquid crystal display (LCD), or other suitable display device. In an embodiment, the display displays color images. In another embodiment, the display 102 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry.

Shown is a soft bar 103. This soft bar 103 may be generated as a graphical object using anyone of a number of example computer languages including Java/Java Micro Edition (JME), C/C++, Java Script, C#, a Hyper-Text Markup Language (HTML), or an eXtensible Markup Language (XML). Further, this soft bar 103 may be displayed vertically or horizontally depending on the orientation of the mobile computing device 110. Specifically, if the mobile computing device 110 is oriented in a portrait manner, then the soft bar 103 is displayed as vertically. Alternatively, if the mobile computing device 110 is oriented in a landscape manner, then the soft bar 103 is displayed horizontally. For the purposes of illustration only, the soft bar 103 is displayed horizontally herein.

Residing on the soft bar 103 is a left position 104, middle position 105, and right position 106. The various positions 104-106 are graphical objects generated using one or more of the above provided example computer languages. These various positions 104-106 are to be understood relative to one another such that the middle position 105 is equidistant from the left position 104 and right position 106 along a line formed by the soft bar 103. Further, the left position 104 and right position 106 are connected by a straight line formed by the soft bar 103, with the middle position 105 being the midway point of this straight line. Given that the mobile computing device 110 may be oriented in a portrait manner, the left position 104 may be represented as an up position, the right position 106 as a down position. The use of the phrases left position, and right position are merely used herein for illustrative purposes. The soft bar 103, left position 104, middle position 105, and right position 106 represent pixel positions on the display 102.

Figure 2:
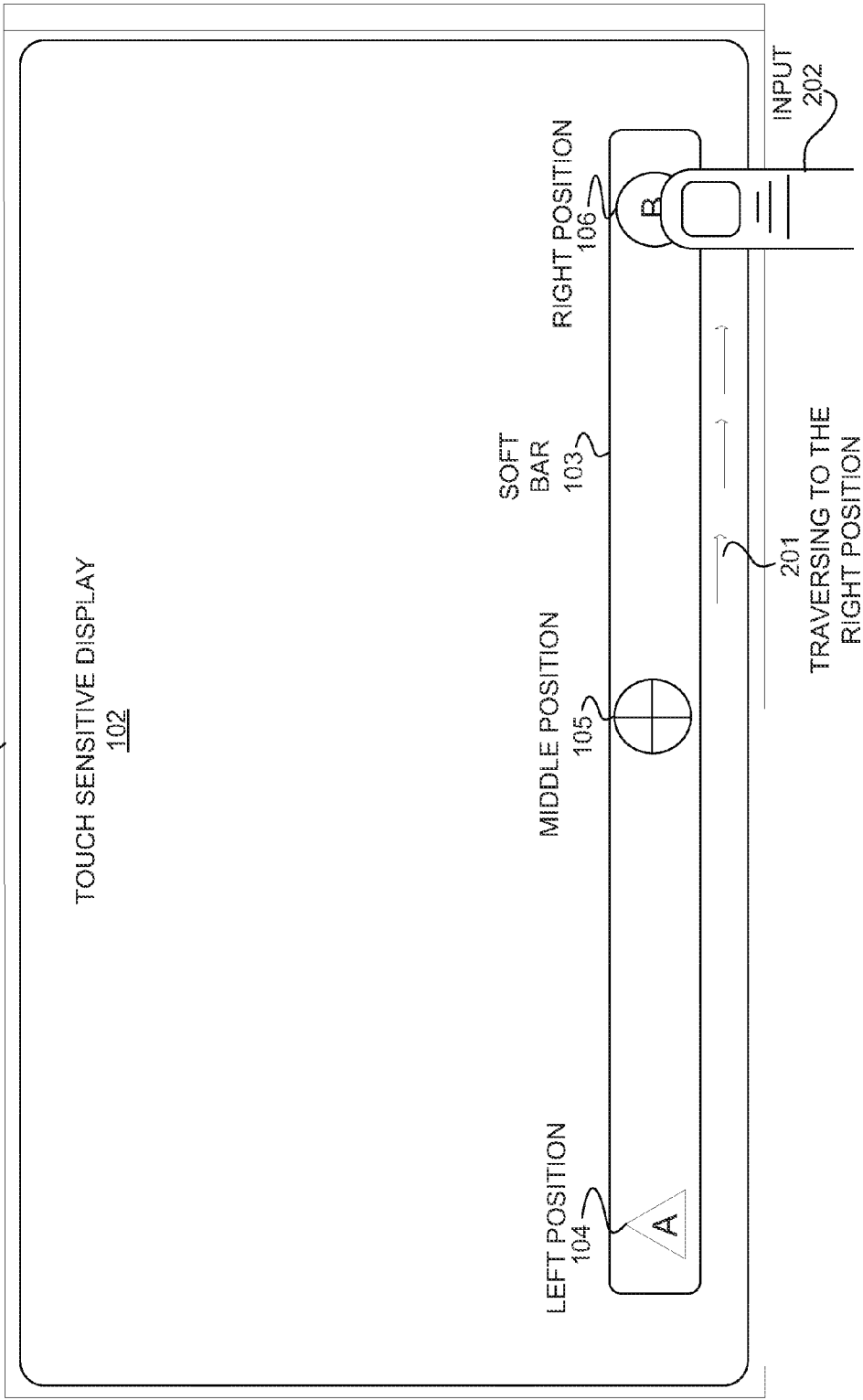
FIG. 2 is a diagram of an example embodiment of the mobile computing device, showing the traversing of the soft bar.

FIG. 2 is a diagram of an example embodiment of the mobile computing device 110, showing the traversing of the soft bar 103. Shown is the soft bar 103 and the traversing of this soft bar 103 from the middle position 105 to the right position 106. This traversing is denoted at 201 and is provided via input 202 to the display 102. Where input 202 intersects the right position 106, a position value (e.g., a right position value) is generated. This position value is used in the generation of a password sequence.

Figure 3:
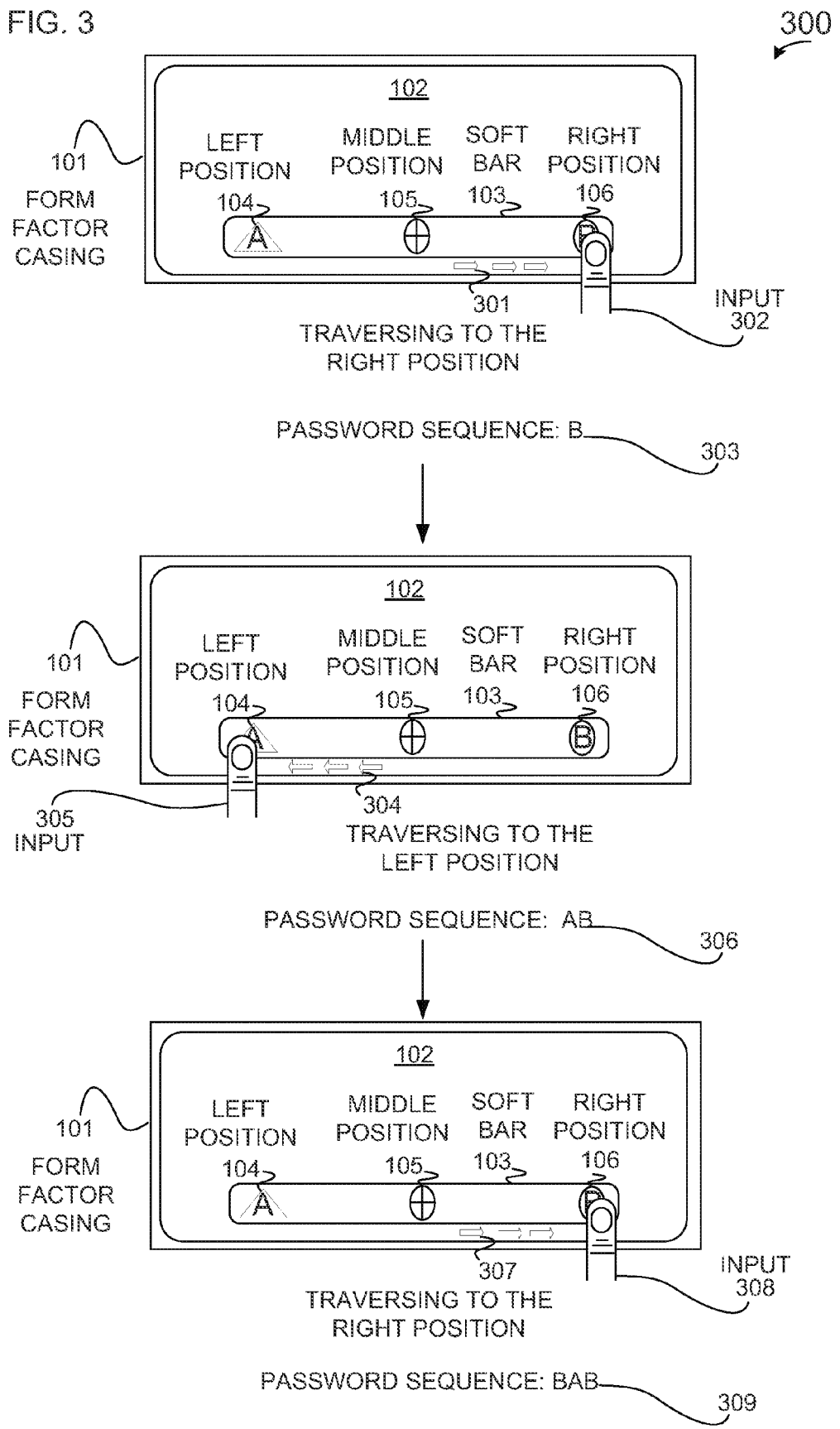
FIG. 3 is a diagram of a sequence of inputs to positions, according to an example embodiment, on a soft bar to generate a password sequence.

FIG. 3 is a diagram of an example sequence of inputs to positions on a soft bar to generate a password sequence. As shown at 301, the soft bar 103 is traversed using the input 302. Specifically, starting at the middle position 105 the input 302 moves along the soft bar 103 and terminates at the right position 106. Where termination occurs, a position value in the form of a character (e.g., "B") may be generated as part of a password sequence. This password sequence is denoted at 303. This character may be an American Standard Code for Information Interchange (ASCII) based character. Further, as shown at 304, the soft bar 103 may be traversed using an input 305, the traversal terminating at the left position 104. Where this traversal terminates, a second position value in the form of a distinct character (e.g., "A") is generated and concatenated with the password sequence such that a new password sequence is generated (e.g., the character string "AB"). This new, concatenated password sequence is shown at 306. A further, new, concatenated password sequence (e.g., the character string "BAB") is shown at 309 where the soft bar 103 is traversed using the input 308. This traversal is denoted at 307 and represents a traversal from the middle position to the right position 106, terminating at this right position 106. This sequence of inputs may continue until the password sequence matches the stored password. Where a match occurs, the GUI of the mobile computing device is unlocked and access to the applications residing on the mobile computing device granted.

Figure 4:
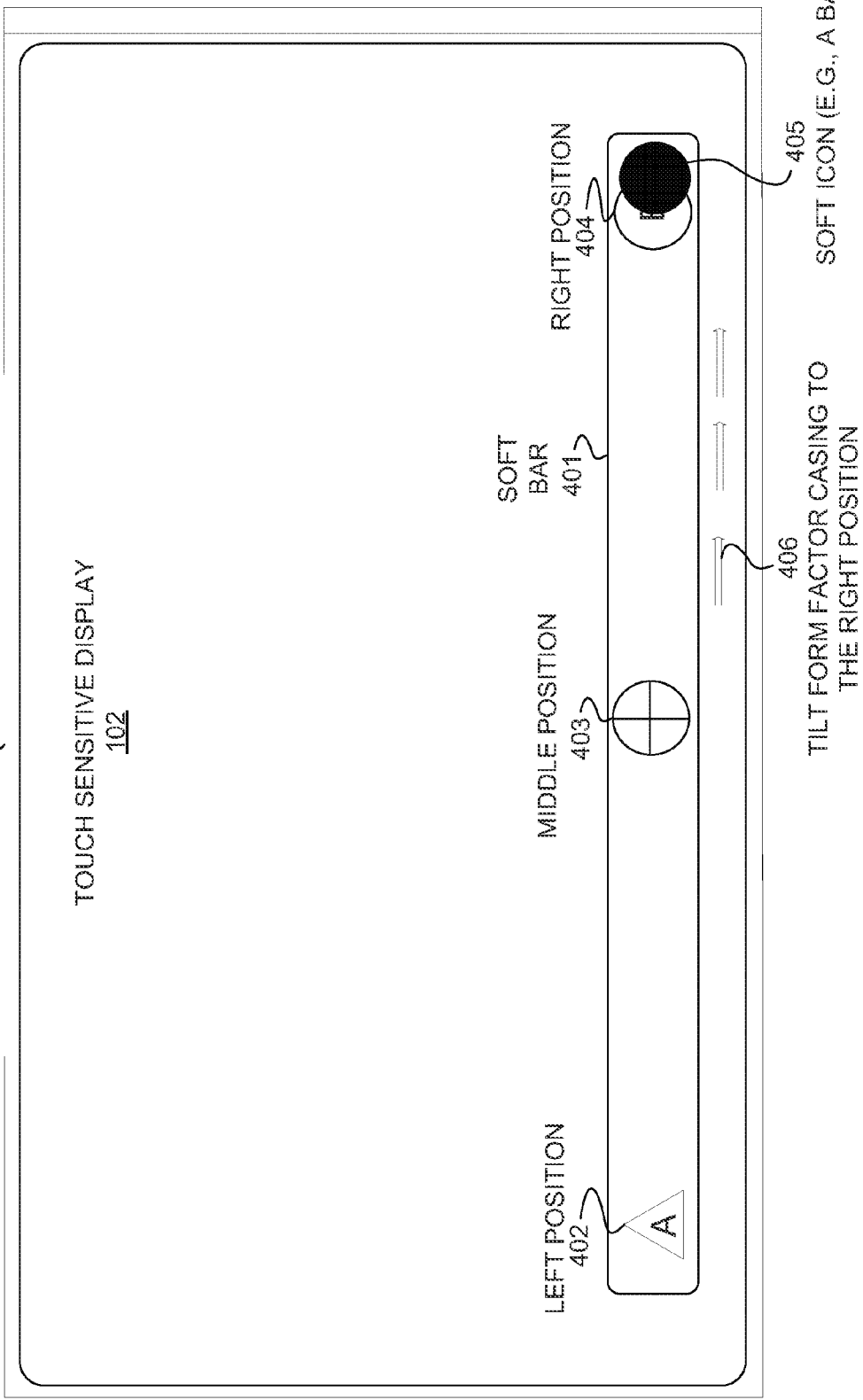
FIG. 4 is a diagram of a mobile computing device, according to an example embodiment, showing the traversing of the soft bar using input generated from an accelerometer.

FIG. 4 is a diagram of an example embodiment of the mobile computing device 110, showing the traversing of the soft bar 401 using input generated from an accelerometer. Illustrated is the soft bar 401 that includes a left position 402, middle position 403, and right position 404. As illustrated, this soft bar 401 may be traversed from the middle position 403 to the right position 404. This traversing is denoted at 406 and is provided via input generated by an accelerometer and the tilting of the form factor casing 101 to the right. A soft icon 405 (e.g., a ball) representing a period of time during which this tilting has occurred may used to illustrate the transversal of the soft bar 401. Specifically, the soft icon 405 may be illustrated as moving linearly between middle position 403 and the right position 404 so as to transverse the soft bar 401, the linear movement based upon the length of time that the form factor casing 101 is tilted to the right. Where soft icon 405 intersects the right position 404, a position value (e.g., a right position value) is generated. This position value is used in the generation of a password sequence.

Figure 5:
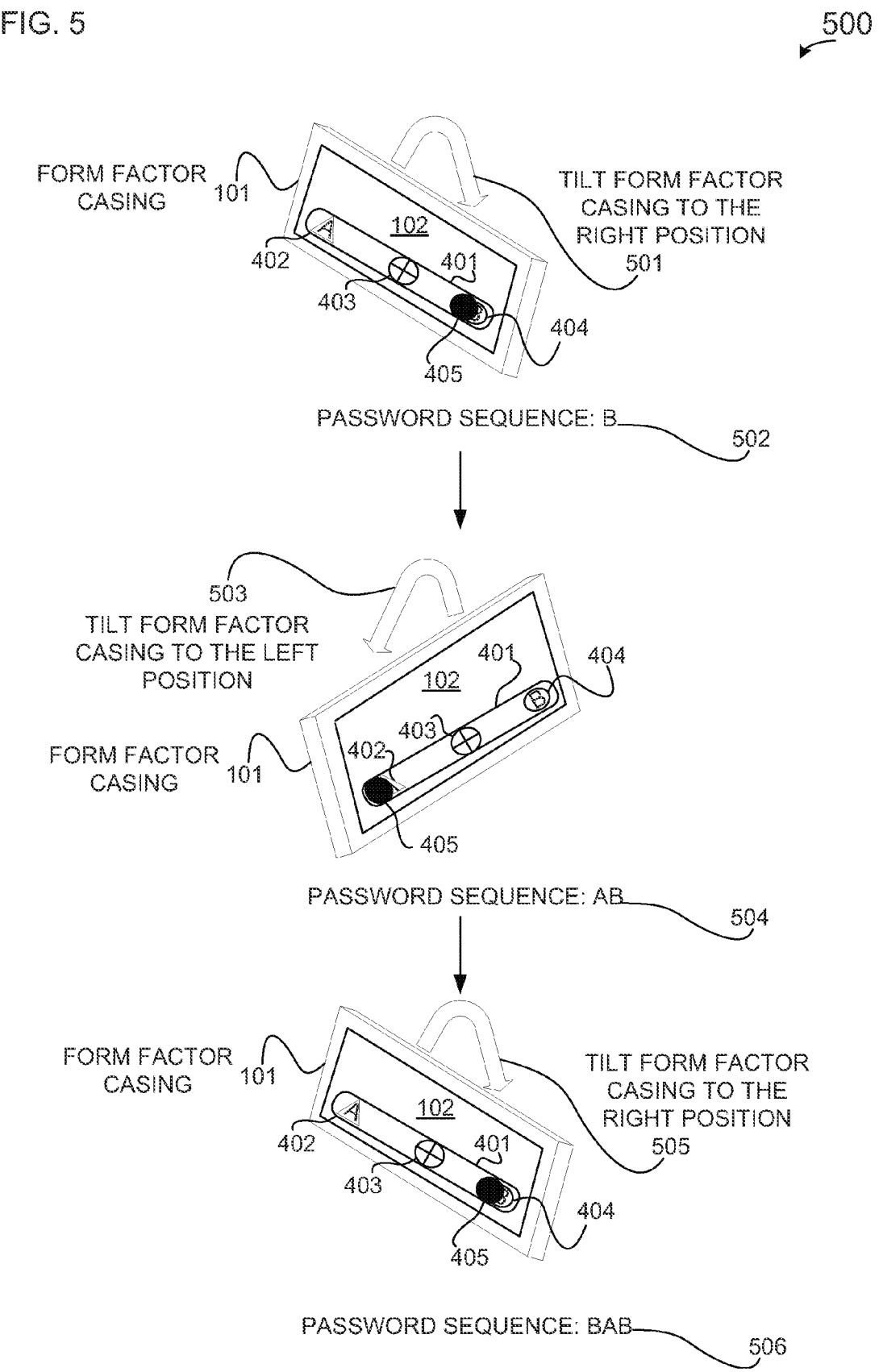
FIG. 5 is a diagram of a sequence of inputs, according to an example embodiment, generated by tilting a form factor casing, the inputs to generate a password sequence.

FIG. 5 is a diagram of an example sequence of inputs 500 generated by tilting a form factor casing, the inputs to generate a password sequence. Illustrated at 501 is a form factor casing 101 that is tilted to the right so as to generate input using an accelerometer. For the period during which the form factor casing 101 is tilted to the right, the soft icon 405 traverses the soft bar 401 and where the soft icon 405 intersects the right position 404 a password sequence (e.g., a position value in the form of the character "B") is generated. This sequence is denoted at 502. Further, as shown at 503, the form factor casing 101 may be tilted to the left so as to generate additional input using an accelerometer. For the period during which the form factor casing 101 is tilted to the left, the soft icon 405 traverses the soft bar 401 and where the soft icon 405 intersects the left position 405 a new password sequence (e.g., the character string "AB") is generated. Specifically, when this traversal terminates, a second distinct position value in the form of the character (e.g., "A") is generated and concatenated with the password sequence such that the new password sequence (e.g., the character string "AB") is generated. This new, concatenated password sequence is shown at 504. A further, new, concatenated password sequence (e.g., the character string "BAB") is shown at

506 where the soft bar 103 is traversed by tilting the form factor casing 101 again to the right. This tilting to the right is shown at 505. The sequence of inputs generated via tilting the form factor casing 101 may continue until the password sequence matches the stored password. Where a match occurs, the GUI of the mobile computing device is unlocked and access to the applications residing on the mobile computing device granted.

Figure 6:
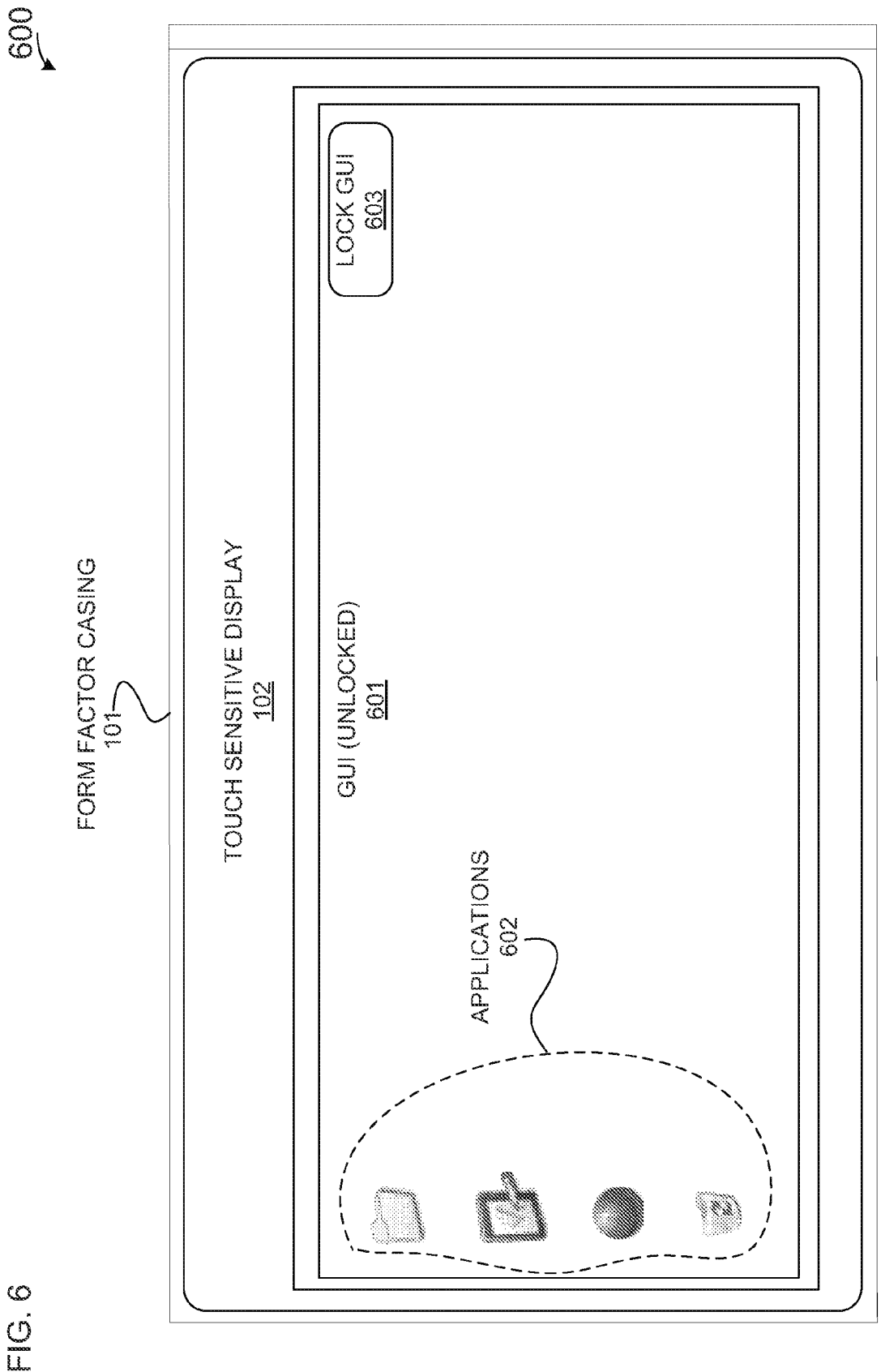
FIG. 6 is a diagram of an unlocked GUI, according to an example embodiment, associated with the mobile computing device.

FIG. 6 is a diagram of an example unlocked GUI associated with the mobile computing device 600. Shown is an unlocked GUI 601 for a mobile computing device 600. This GUI 601 is unlocked where a match exists between the candidate and stored passwords. Once unlocked, one or more applications 602 may be made available to a user of the mobile computing device 600 and the GUI 601 associated therewith. In some example embodiments, a soft button 603 is provided that when executed locks the GUI 601. The soft button 603 is a graphical object generated using anyone of a number of example computer languages provided above. Further, the above illustrated sequence of inputs may be provided to unlock this GUI 601.

Figure 7:
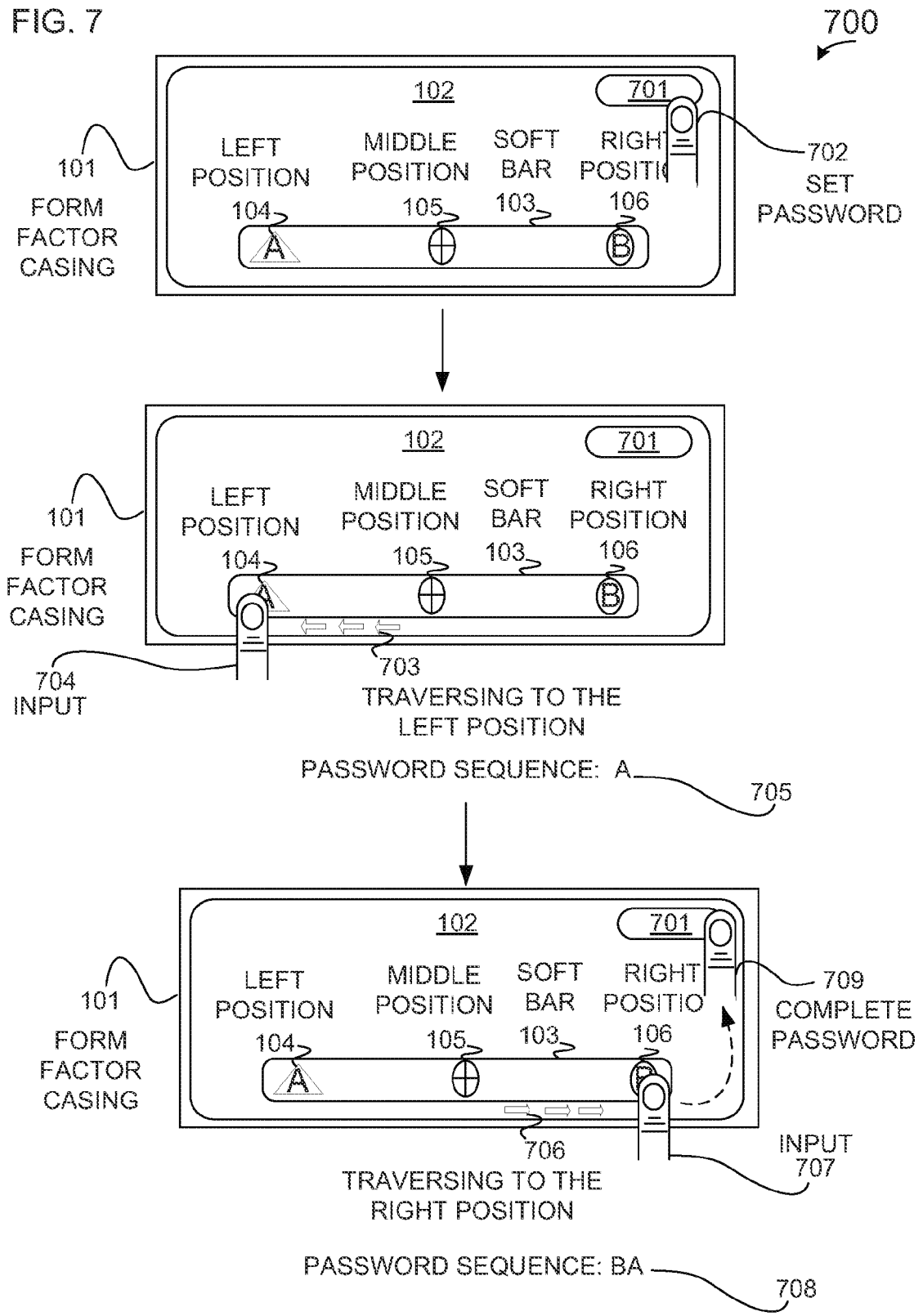
FIG. 7 is a diagram of a sequence of inputs, according to an example embodiment, used to set a password for a mobile computing device.

FIG. 7 is a diagram of an example sequence of inputs 700 used to set a password for a mobile computing device. Shown is a mobile computing device with a display 102. Residing on the display 102 is a soft button 701. As denoted at 702, in some example embodiments, the soft button 701 is executed via an input so as to record a sequence of inputs to generate a password sequence. For example, as shown at 703 the input 704 is used to traverse the soft bar 103 to the left position 104. Where the position of the input 704 on the soft bar 103 and the left position 104 intersect, a first character (e.g., "A") is generated as part of a password sequence. This password sequence is denoted at 705. Further, as denoted at 708, additional characters may be added to the password sequence through traversing to the right (see 706), or by repeating the traversal noted at 703. Where the input 707 intersects the right position 106, an additional character for the password sequence is generated. As noted at 709, in cases where a complete password sequence has been generated, the soft button 701 executed via an input to cease to generation of the password sequence. Where the soft button 701 is executed to complete a password, the password sequence is stored into memory on the mobile computing device 110 as a password to be used to control access to the mobile computing device. In some example embodiments, the setting of the password is performed by executing the soft button 701 and sequentially tilting the form factor case 101 to generate the requisite password sequence. In some example embodiments, a user is requested to re-enter the password (i.e., execute the sequence shown in FIG. 7) to confirm the password.

Figure 8:
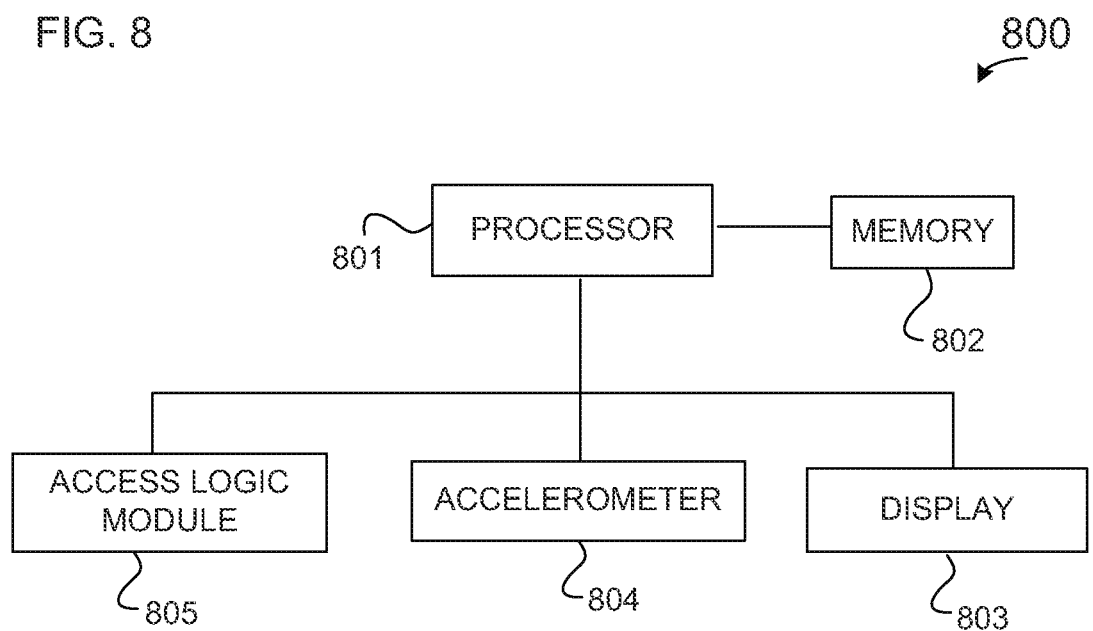
FIG. 8 is a block diagram of a system, according to an example embodiment, to control access to a mobile computing device through the use of a sequence of input positions on a soft input bar.

FIG. 8 is a block diagram of an example system 800 to control access to a mobile computing device through the use of a sequence of input positions on a soft input bar. The various blocks shown herein may be implemented in software, hardware, or firmware, The mobile computing device 110 is an example of the system 800. These blocks may be operatively connected. Operatively connected, as used herein, includes a logical or physical connection. Shown is a processor 801 operatively connected to a memory 802. Operatively connected to the processor 801 is a display 803 to show a soft bar and soft icon, the soft bar including a middle position, a first position and a second position that are equal distance from the middle position. Operatively connected to the processor 801 is an accelerometer 804 to receive input indicative of a tilting of the apparatus, the soft icon to traverse the soft bar where tilting occurs. Additionally, operatively connected to the processor 801 is an access logic module 805 to grant access to an application residing on the apparatus, the access granted based upon a number of times the soft icon intersects at least one of the first position or the second position. In some example embodiments, the first position and the second position are each one of a left position, a right position, up position, and down position. The apparatus may be a mobile computing device 110. The access logic module 805 stores a password, the password to include position values, each position value generated based upon the number of times the soft icon intersects at least one of the first position or the second position. In some example embodiments, is the position value is a character representing one of the first or second position.

Figure 9:
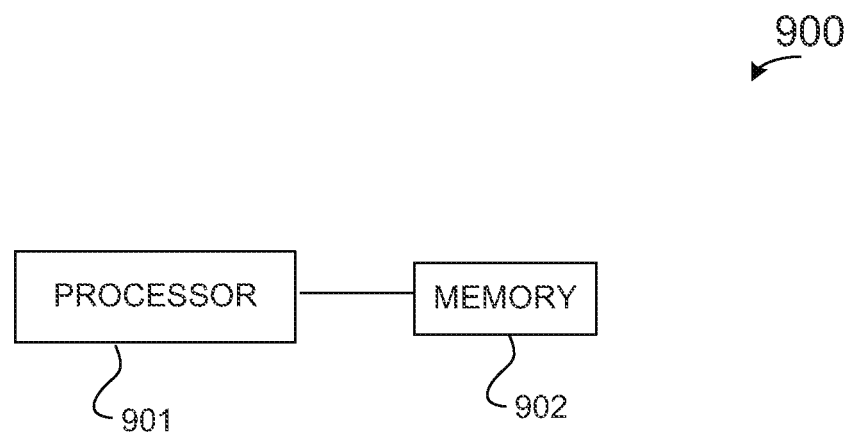
FIG. 9 is a block diagram of a system, according to an example embodiment, used to control access to a mobile computing, device through the use of a sequence of input positions on a soft bar.

FIG. 9 is a block diagram of an example system 900 used to control access to a mobile computing device through the use of a sequence of input positions on a soft input bar. The mobile computing device 110 is an example of the system 900. Shown is a processor 901 operatively connected to a memory 902. The processor 901 and memory 902 may reside on the mobile computing device 110. The memory 902 is in communication with the central processor 901, the memory 902 including a non-transitory computer-readable medium or machine-readable medium having instructions stored thereon for causing a suitably programmed computer to execute a method comprising receiving input at a soft bar, the input received at a middle position on the soft bar equal distance from a first position and a second position on the soft bar. Further, this method includes traversing the soft bar from the middle position to one of the first or second position, using the input, a plurality of times to generate a candidate password, each traversal to generate a position value that is part of the candidate password. Additionally, the method includes unlocking a GUI for use, the unlocking to occur where the candidate password is equivalent to stored password. In some example embodiments, non-transitory computer-readable medium includes the input as a signal generated by a touch sensitive display. Additionally, the method residing on the non-transitory computer-readable medium may include traversing as a movement of the input from a first pixel position to a second pixel position, where the first and second pixel positions reside on the soft bar and are adjacent. In some example embodiments, the soft bar is displayed based upon the orientation of a mobile computing device, the display of the soft bar to be one of vertically or horizontally where the mobile computing device is oriented in a vertical or horizontal manner. Further, the unlocking the GUI may include granting access to the at least one application residing on a mobile computing device.

Figure 10:
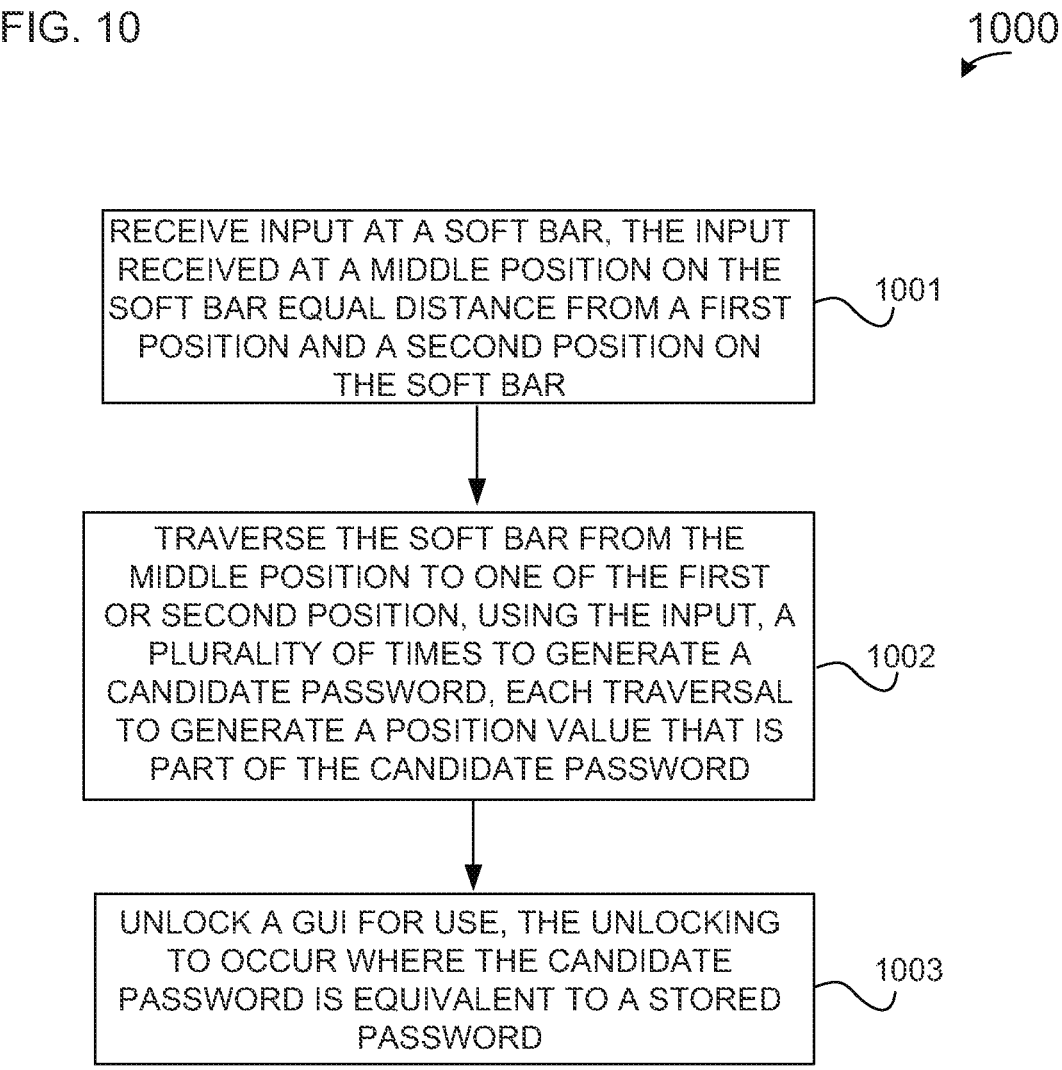
FIG. 10 is a flow chart illustrating a method, according to an example embodiment, executed to control access to a mobile computing device through the use of a sequence of input positions on a soft input bar.

FIG. 10 is a flow chart illustrating an example method 1000 executed to control access to a mobile computing device through the use of a sequence of input positions on a soft bar. The method 1000, and operations 1001-1003 included therein, may be executed on the mobile computing device 110. Operation 1001 is executed to receive input at a soft bar, the input received at a middle position on the soft bar equal distance from a first position and a second position on the soft bar. Operation 1002 is executed to traverse the soft bar from the middle position to one of the first or second position, using the input, a plurality of times to generate a candidate password, each traversal to generate a position value that is part of the candidate password. Operation 1003 is executed to unlock a GUI for use, the unlocking to occur where the candidate password is equivalent to a stored password. In some example embodiments the input is a signal generated by a touch sensitive display. In some example embodiments, traversing includes movement of the input from a first pixel position to a second pixel position, where the first and second pixel positions reside on the soft bar and are adjacent. In some example embodiments, the soft bar is displayed based upon the orientation of a mobile computing device, the display of the soft bar to be one of vertically or horizontally where the mobile computing device is oriented in a vertical or horizontal manner. The unlocking the GUI may include granting access to the at least one application residing on a mobile computing device.

Figure 11:
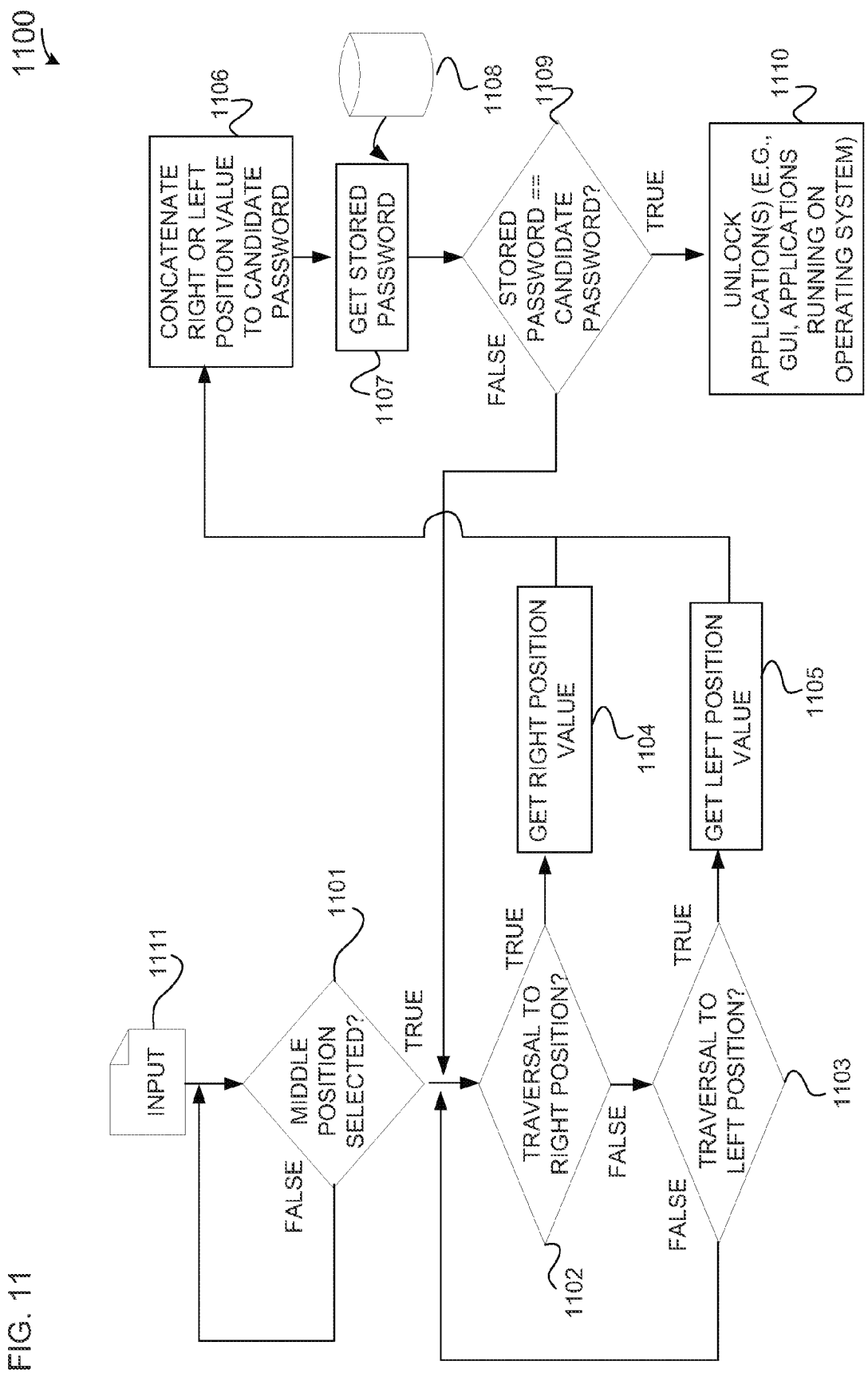
FIG. 11 is a flow chart illustrating an execution of a method, according to an example embodiment, used to control access to a mobile computing device through the use of a sequence of input positions on a soft input bar.

FIG. 11 is a flow chart illustrating an example execution of a method 1100 used to control access to a mobile computing device through the use of a sequence of input positions on a soft bar. The method 1100 is executed on the mobile computing device 110. Shown is a decision operation 1101 that receives input 1111 and determines whether a middle position (e.g., the middle position 105) has been selected based upon this input 1111. In cases where decision operation 1101 evaluates to "false", the decision operation 1101 is re-executed. In cases where the decision operation 1101 evaluates to "true", a decision operation 1102 is executed. Decision operation 1102 determines whether the input in the form of a traversal to the right position (e.g., the right position 106) has been received. In cases where decision operation 1102 evaluates to "true", an operation 1104 is executed. In cases where decision operation 1102 evaluates to "false", a decision operation 1103 is executed. Operation 1104 is executed to get the right position value. This position value may be an ASCII character such as "A" or "B". Decision operation 1103 is executed to determine whether the input in the form of a traversal to the left position (e.g., the left position 104) has been received. In cases where decision operation 1103 evaluates to "false", the decision operation 1102 is re-executed. In cases where the decision operation 1103 evaluates to "true", the operation 1105 is executed. Operation 1105 is executed to get a left position value. This position value may be an ASCII character such as "A" or "B". Operation 1106 is executed to concatenate the position value (e.g., the left or right position value) to form a password sequence that is then a candidate password. Operation 1107 is executed to get a stored password from the password store 1108. Decision operation 1109 is executed to compare the stored password to the candidate password to determine their equivalency. In cases where the stored password and candidate password are equivalent, the decision operation 1109 evaluates to "true", and the operation 1110 is executed. In cases where the decision operation 1109 evaluates to "false", the decision operation 1102 is re-executed. In cases where 1109 evaluates to "false", the end user may release his finger (i.e., the input 202) and start again entering the password sequence from the middle position 105. Operation 1110 is executed to unlock the applications (e.g., GUI, applications etc.) running on the mobile computing device 110 and operating system associated therewith.

Figure 12:
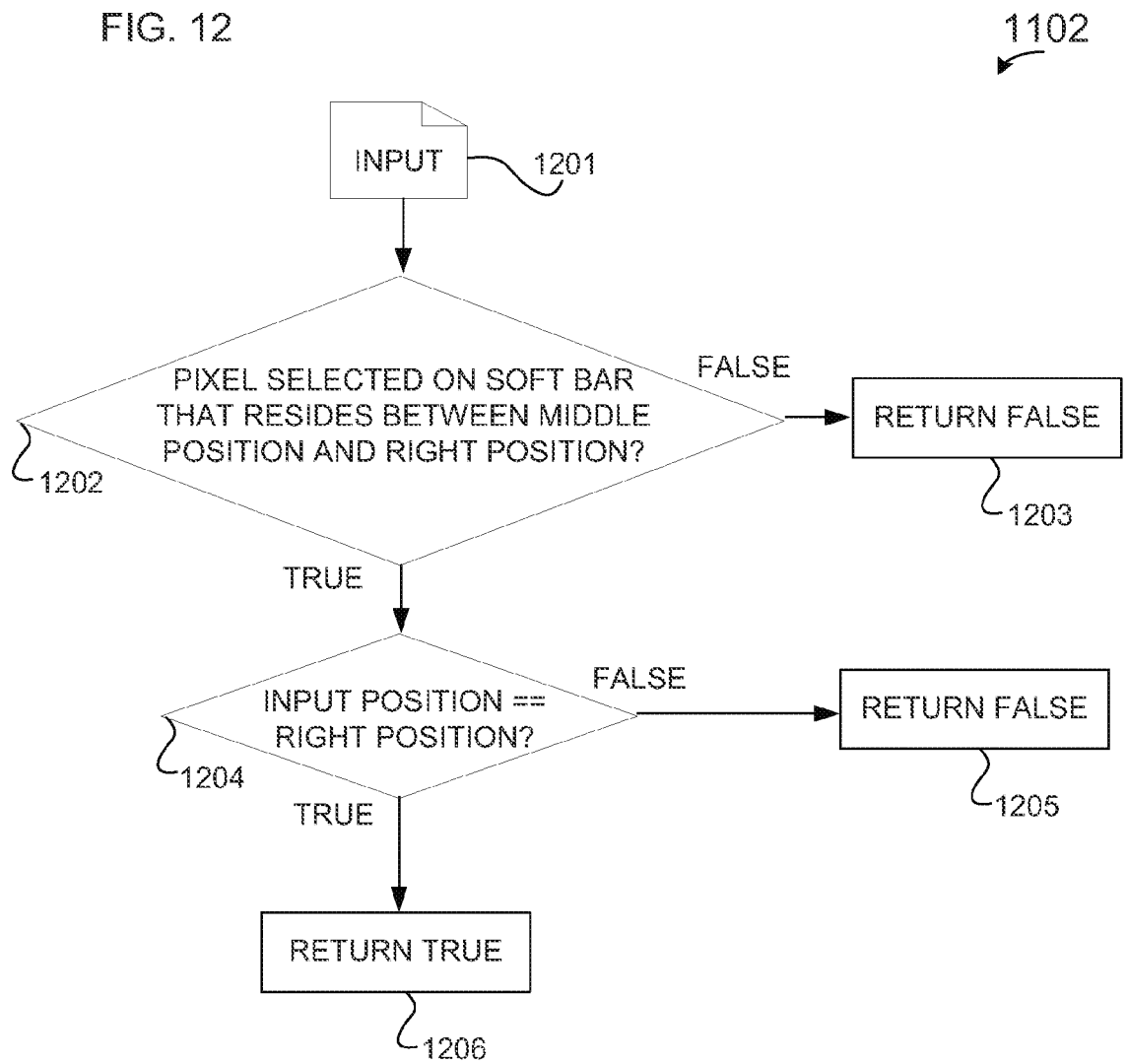
FIG. 12 is a flow chart illustrating the execution of a decision operation, according to an example embodiment, used to determine whether the input in the form of a traversal to the right position has been received.

FIG. 12 is a flow chart illustrating the example execution of a decision operation 1102 used to determines whether the input in the form of a traversal to the right position the right position 106) has been received. The logic of operation 1102 may be used in the execution of decision operation 1103, where "right position" is substituted with "left position". Shown is a decision operation 1202 that is executed to determine whether the input 1201 denotes a pixel selected on the soft bar 103 that resides between the middle the position 105 and right position 106 in cases where decision operation 1202 evaluates to "false", an operation 1203 is executed. In cases where decision operation 1202 evaluates to "true", a decision operation 1204 is executed. Operation 1203 is executed to return a boolean "false" value. Decision operation 1204 is executed to determine whether the input position (i.e., the pixel position associated with the input) denoted by input 1201 is equivalent to the right position 106 and the pixels associated therewith. In cases where decision operation 1204 evaluates to "false", an operation 1205 is executed that executed to return a "false" boolean value. In cases where decision operation 1204 evaluates to "true", an operation 1206 is executed to return a "true" boolean value.

Figure 13:
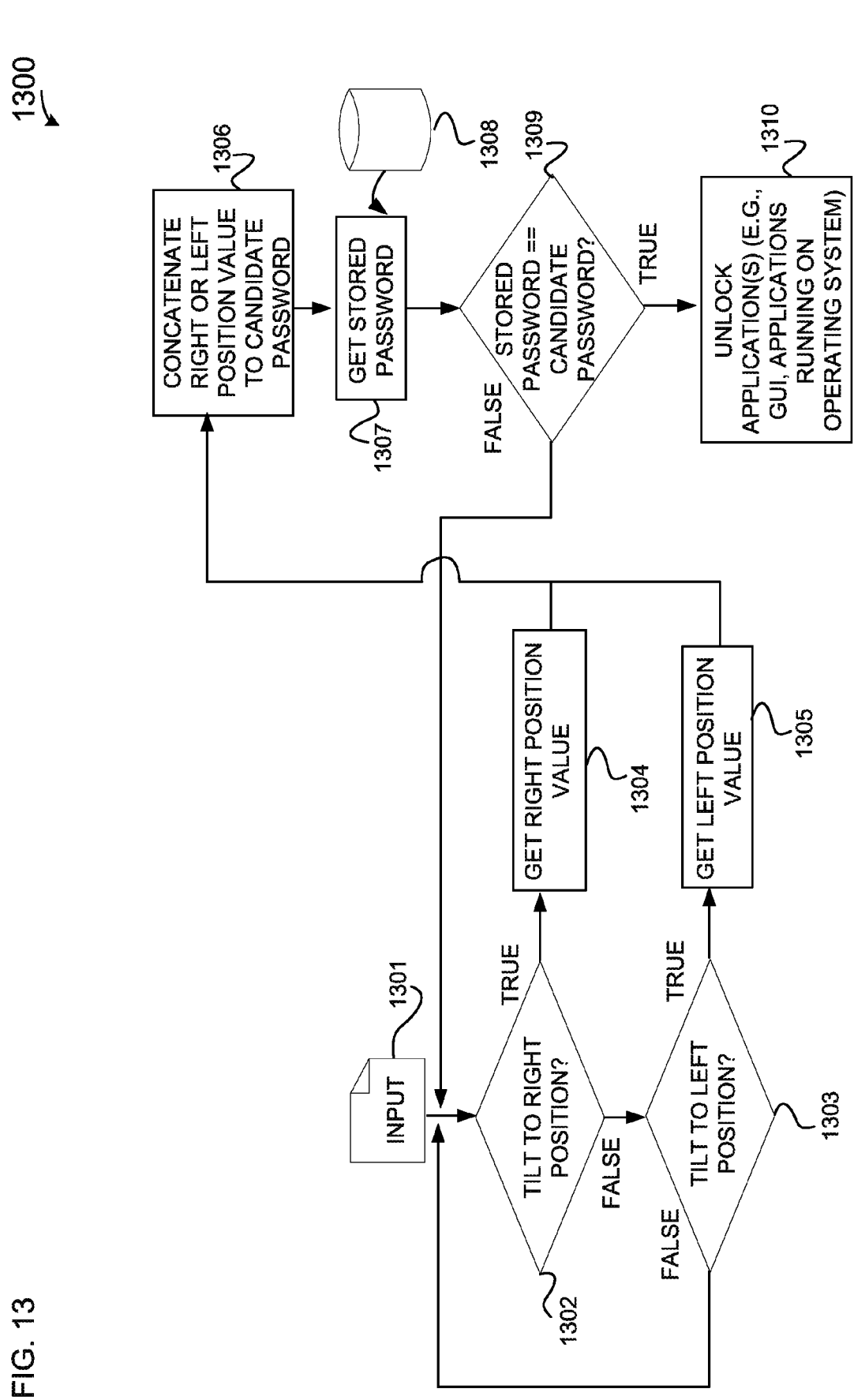
FIG. 13 is a flow chart illustrating an execution of a method, according to an example embodiment, used to control access to a mobile computing device by generating inputs through tilting a form factor casing of the mobile computing device, the inputs to generate a password sequence.

FIG. 13 is a flow chart illustrating an example execution of a method 1300 used to control access to a mobile computing device by generating inputs through tilting a form factor casing of the mobile computing device, the inputs to generate a password sequence. The method 1300 is executed on the mobile computing device 110. Shown is a decision operation 1302 that determines whether the form factor casing 101 has been tilted to the right position 501. In some example embodiments, a soft button (not pictured) associated with the middle position 403 is executed to identify the mobile computing device as being in a mode that seeking to unlock applications. This determination is based upon an analysis of the input 1301 by the decision operation 1302. Input 1301 is generated by an accelerometer. In cases where decision operation 1302 evaluates to "true", an operation 1304 is executed. In cases where decision operation 1302 evaluates to "false", a decision operation 1303 is executed. Operation 1304 is executed to get the right position value. This position value may be an ASCII character such as "A" or "B". Decision operation 1303 is executed to determine whether the form factor casing 101 has been tilted to the left position 503. In cases where decision operation 1303 evaluates to "false", the decision operation 1302 is re-executed. In cases where the decision operation 1303 evaluates to "true", the operation 1305 is executed. Operation 1305 is executed to get a left position value. This position value may be an ASCII character such as "A" or "B". Operation 1306 is executed to concatenate the position value (e.g., the left or right position value) to form a password sequence that is then a candidate password. Operation 1307 is executed to get a stored password from the password store 1308. Decision operation 1309 is executed to compare the stored password to the candidate password to determine their equivalency. In cases where the stored password and candidate password are equivalent, the decision operation 1309 evaluates to "true", and the operation 1310 is executed. In cases where the decision operation 1309 evaluates to "false", the decision operation 1302 is re-executed. In cases where 1309 evaluates to "false", the end user may re-execute the soft button (not pictured) associated the middle position 403 and start again entering the password sequence as inputs generated through tilting of the form factor casing 101. Operation 1310 is executed to unlock the applications (e.g. GUI, applications etc) running on the mobile computing device 110 and operating system associated therewith.

Figure 14:
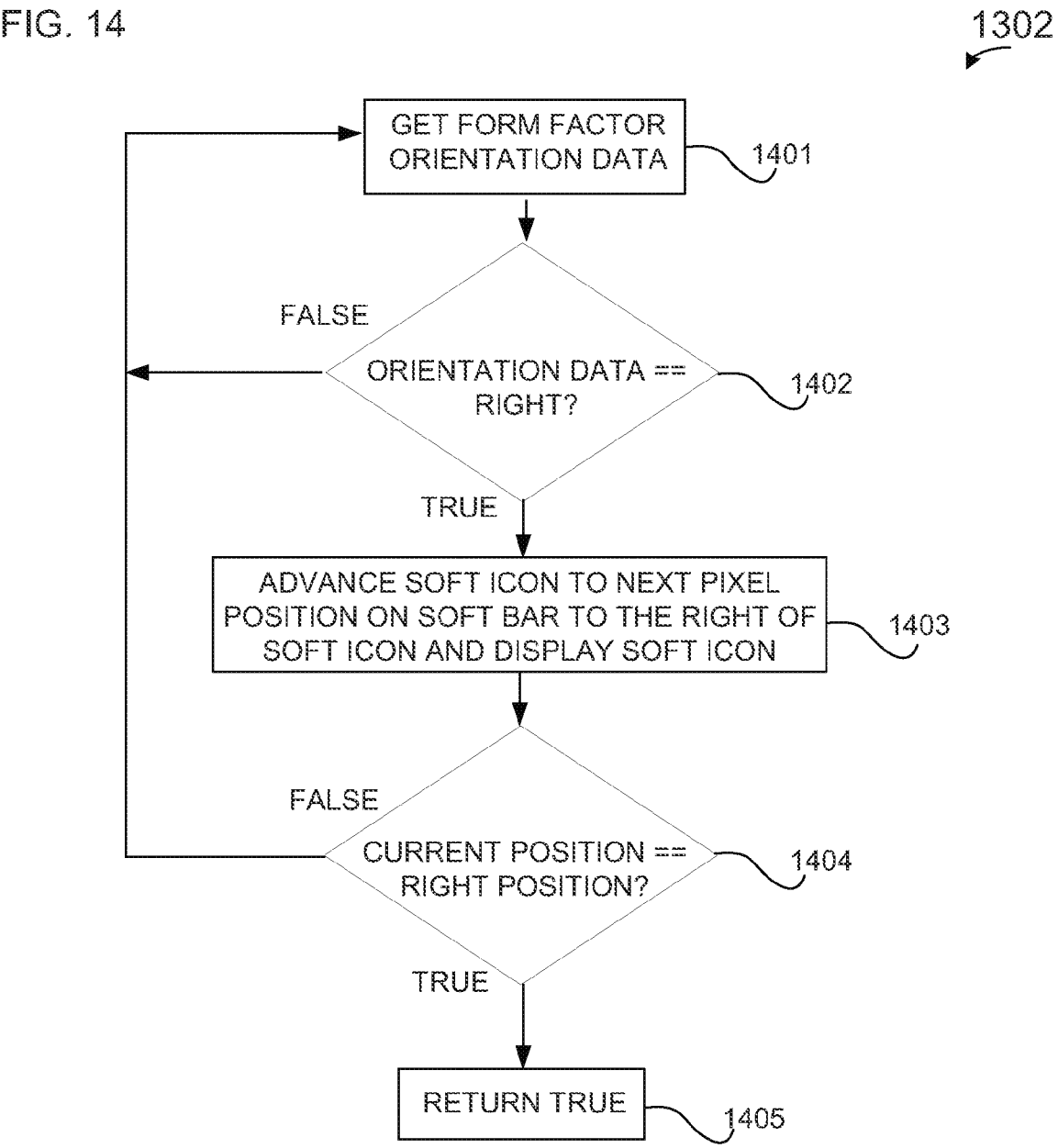
FIG. 14 is a flow chart illustrating the execution of a method, according to an example embodiment, to determine whether the form factor casing has been tilted to the right position.

FIG. 14 is a flow chart illustrating the example execution of a method to determine whether the form factor casing 101 has been tilted to the right position 501. Shown is an operation 1401 that is executed to get form factor orientation data. A decision operation 1402 is executed to determine whether the orientation data denotes a tilt of the device to the right. In cases where decision operation 1402 evaluates to "false", operation 1401 is re-executed. In cases where decision operation 1402 evaluates to "true", an operation 1403 is executed. Operation 1403 is executed to advance a soft icon 405 to a next pixel position on the soft bar to the right of the soft icon and display the soft icon. In some example embodiments, this next pixel adjacent to the pixels used to generate the soft icon 405 at its current position. A decision operation 1404 is executed to determine whether the current position of the soft icon 405 is equivalent to the right position (e.g., right position 404). In cases where decision operation 1404 evaluates to "false" the operation 1401 is re-executed. In cases where the decision operation 1404 evaluates to "true", an operation 1405 is executed. Operation 1405 is executed to return a boolean value of "true". In some example embodiments, the determination of whether the form factor casing 101 has been tilted to the left position 503 can be determined through substituting the pixel positions of the left position for those of the right position.

Figure 15:
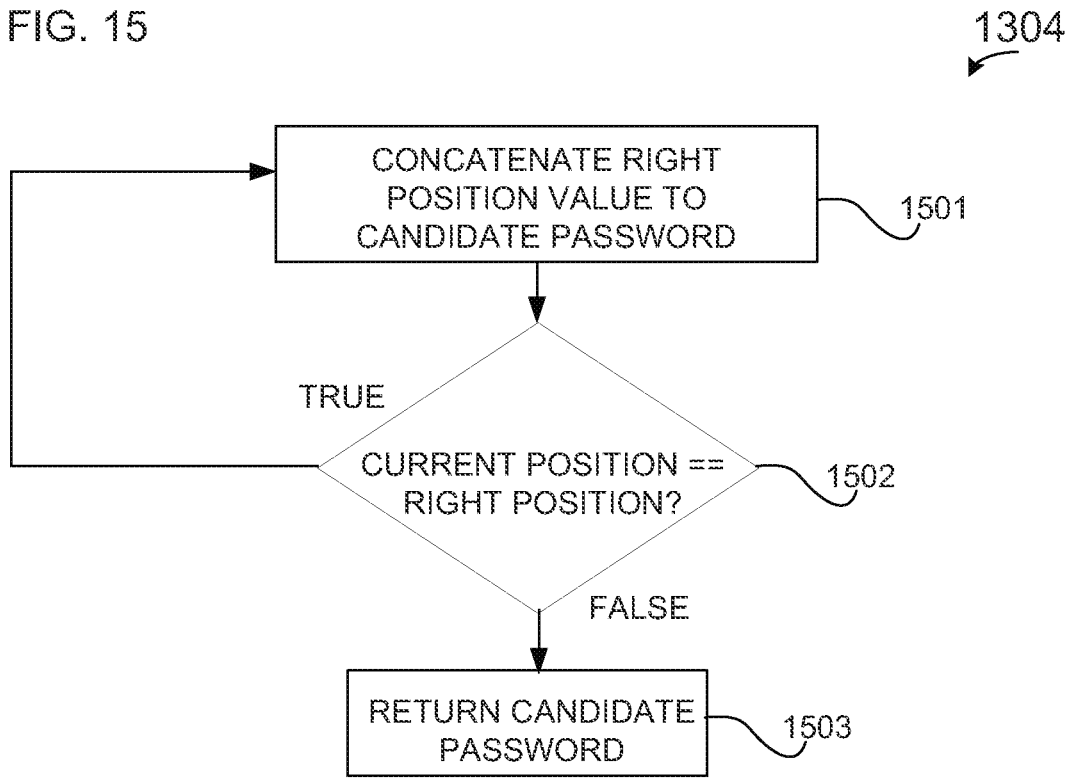
FIG. 15 is a flow chart illustrating an execution of a method, according to an example embodiment, to get the right position value.

FIG. 15 is a flow chart illustrating an example execution of the method to get the right position value. Shown is an operation 1501 that is executed to concatenate a right position value to a candidate password. A decision operation 1502 is executed to determine whether the current position is equivalent to the right position. This equivalence is determined based upon comparing pixel positions of the current position of the soft icon 405 to that of the right position 404. In cases where decision operation 1502 evaluates to "true", the operation 1501 is executed. In cases where the decision operation 1502 evaluates to "false", an operation 1503 is executed. Operation 1503 is executed to return the candidate password as, for example, a string of characters.

Figure 16:
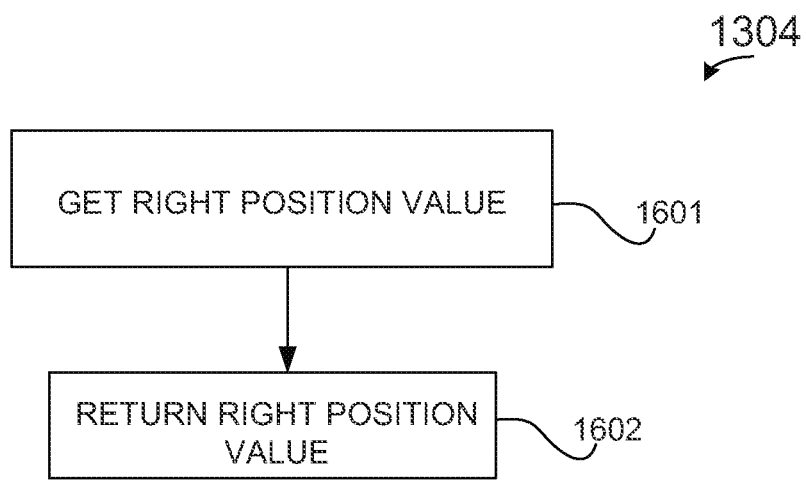
FIG. 16 is a flow chart illustrating the execution of a method, according to an example embodiment, to get the right position value.

FIG. 16 is a flow chart illustrating the example execution of the method to get the right position value. Specifically, FIGS. 15 and 16 are alternative embodiments. Operation 1601 is executed to get the right position value. Operation 1602 is executed to return the right position value. The right position value may be a character such as "A" or "B".

Figure 17:
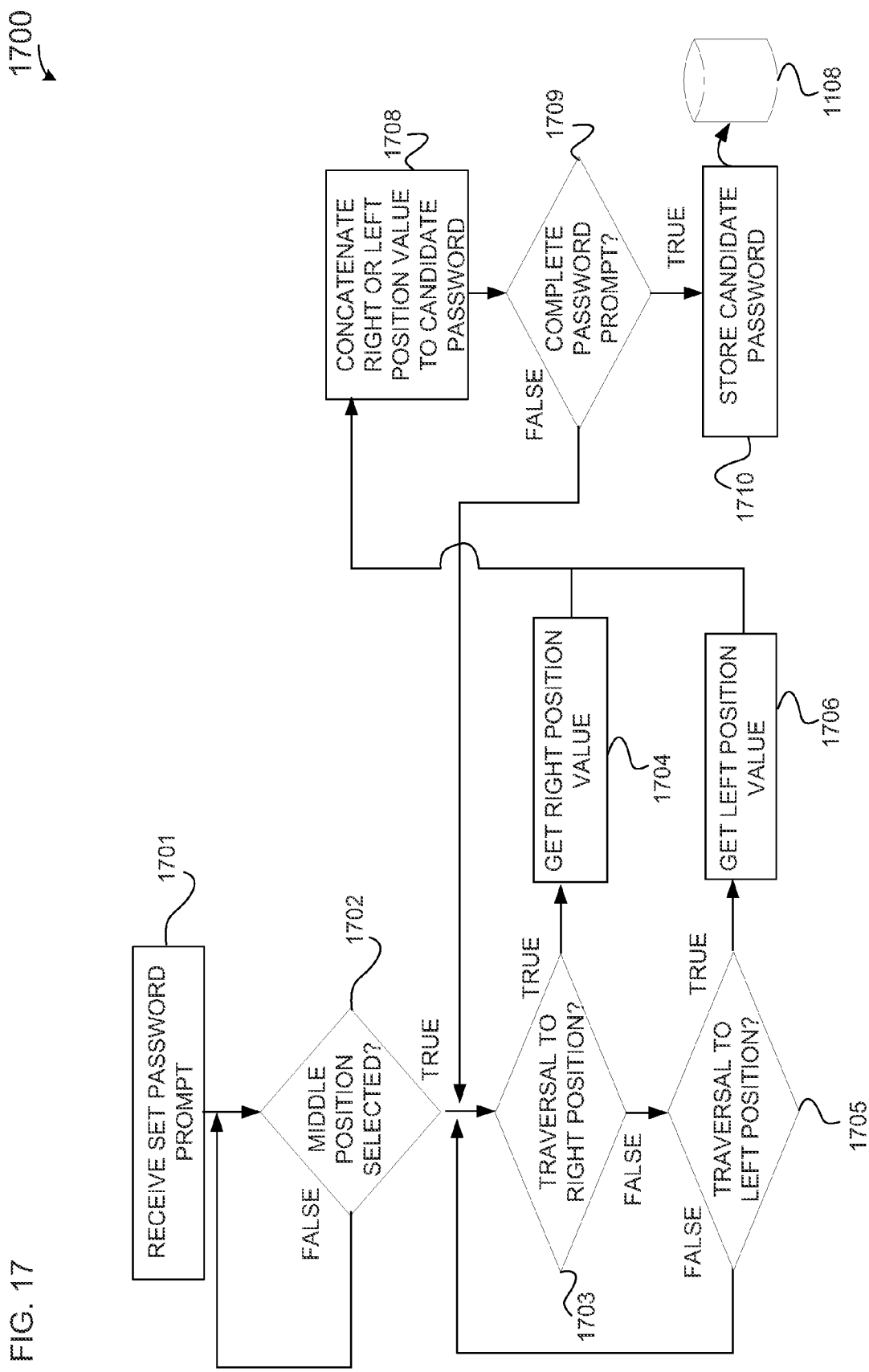
FIG. 17 is a flow chart illustrating a method, according to an example embodiment, used to set a password for a mobile computing device.

FIG. 17 is a flow chart illustrating an example method 1700 used to set a password for a mobile computing device. This method 1700 may be executed by the mobile computing device 110 as part of the sequence of inputs 700 used to set a password for the mobile computing device 110. Shown is an operation 1701 that is executed to receive a set password prompt. This prompt may be a boolean value. The execution of the soft button 701 may generate this password prompt. Decision operation 1702 is executed to determine whether the middle position has been selected. Middle position may be the middle position 105. In cases where decision operation 1702 evaluates to "false", the decision operation 1702 is re-executed. In cases where decision operation 1702 evaluates to "true", a decision operation 1703 is executed. In cases where decision operation 1703 evaluates to "true", an operation 1704 is executed. In cases where decision operation 1703 evaluates to "false", a decision operation 1705 is executed. Operation 1704 is executed to get the right position value. This position value may be an ASCII character such as "A" or "B". In some example embodiments, decision operation 1703 is executed to determine whether the form factor casing 101 has been tilted to the right position 501. Alternatively, in some example embodiments, the decision operation 1703 is executed to determine whether an input 706 has traversed the soft bar 103 to the right position 106. In cases where decision operation 1703 evaluates to "false", the decision operation 1705 is executed. Decision operation 1705 is executed to determine whether a traversal, by the input 704, to the left position 104 has occurred. Alternatively, the decision operation 1705 may be executed to determine whether the form factor casing 101 has been tilted, to the right position as denoted at 503. In cases where the decision operation 1705 evaluates to "true", the operation 1706 is executed. In cases where decision operation 1705 evaluates to "false", decision operation 1703 is re-executed. Operation 1706 is executed to act a left position value. This position value may be an ASCII character such as "A" or "B". Operation 1708 is executed to concatenate the position value (e.g., the left or right position value) to form a password sequence that is then a candidate password. Decision operation 1709 is executed to determine whether a complete password prompt has been received. This prompt may be a boolean value generated, through the execution of the soft button 701 as denoted at 709. In cases where decision operation 1709 evaluates to "false" the decision operation 1703 is re-executed. In cases where the decision operation 1709 evaluates to "true" an operation 1710 is executed. Operation 1710 is executed to store the candidate password to the password store 1108.

Figure 18:
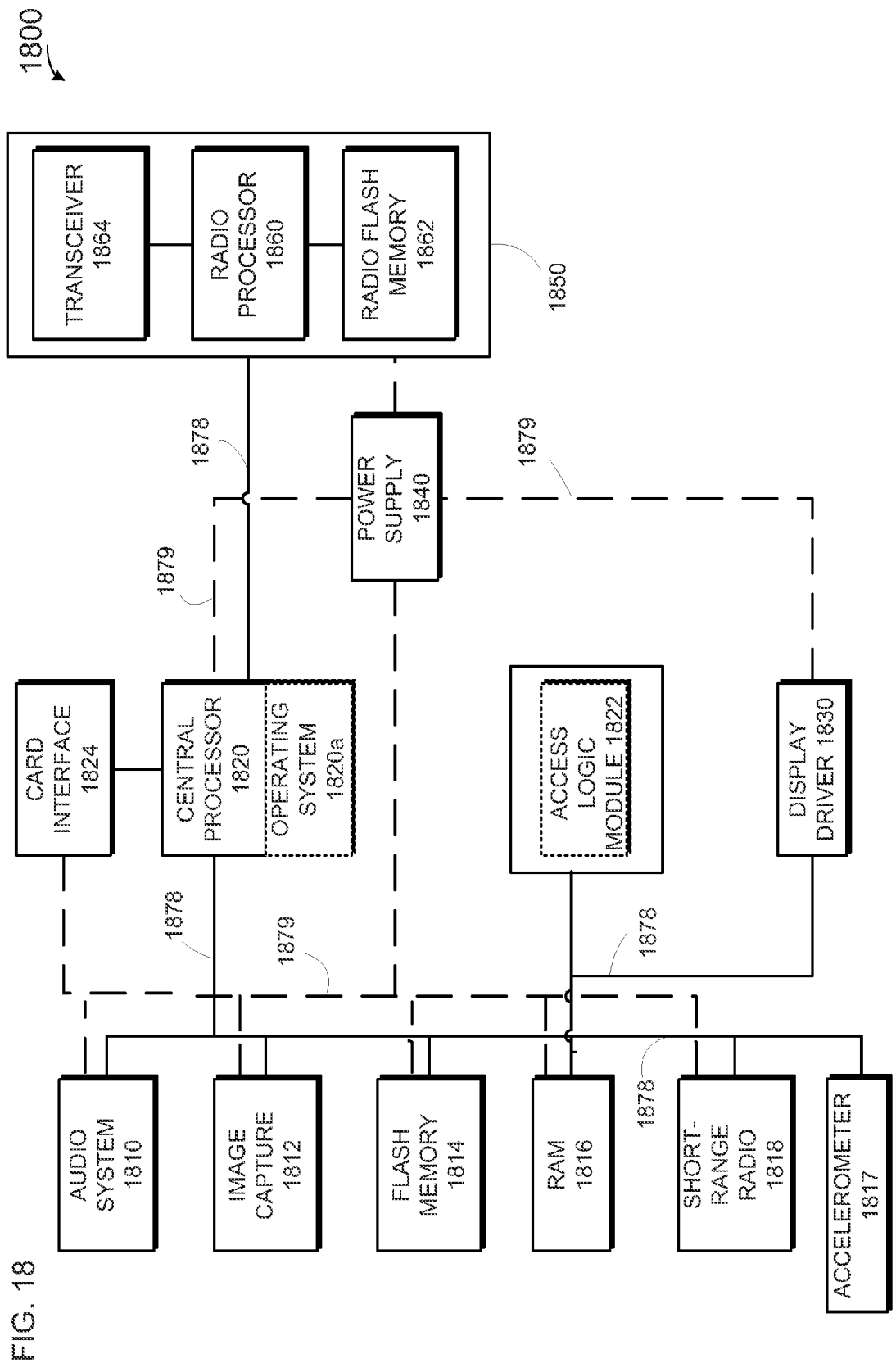
FIG. 18 is a block diagram illustrating an example architecture of a mobile computing device.

Referring next to FIG. 18, a block diagram illustrates an example architecture of a mobile computing device 110, enabled to execute any of the above illustrated methods. By way of example, the architecture illustrated in FIG. 18 will be described with respect to the mobile computing device of FIG. 1. The mobile computing device 110 includes a central processor 1820, a power supply 1840, and a radio subsystem 1850. Examples of a central processor 1820 (see also processors 801 and 901) include processing chips and system based on architectures such as ARM (including cores made by microprocessor manufacturers), ARM XSCALE, QUALCOMM SNAPDRAGON, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 1820 is configured for operation with a computer operating system 1820a. The operating system 1820a is an interface between hardware and an application, with which a user typically interfaces. The operating system 1820a is responsible for the management and coordination of activities and the sharing of resources of the mobile computing device 110. The operating system 1820a provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE 8), SYMBIAN OS, RIM BLACKBERRY OS, APPLE OS (including MAC OS and IPHONE OS), GOOGLE ANDROID, and LINUX.

The central processor 1820 communicates with an audio system 1810, an image capture subsystem (e.g., camera, video or scanner) 1812, flash memory 1814, RAM memory 1816, accelerometer 1817, and a short range radio module 1818 (e.g., Bluetooth, Wireless Fidelity (WiFi) component (e.g., IEEE 802.11, 802.20, 802.15, 802.16)). The central processor 1820 communicatively couples these various components or modules through a data line (or bus) 1878. The power supply 1840 powers the central processor 1820, the radio subsystem 1850 and a display driver 1830 (which may be contact- or inductive-sensitive). The power supply 1840 may correspond to a direct current source (e.g., a battery pack, including rechargeable) or an alternating current (AC) source. The power supply 1840 powers the various components through a power line (or bus) 1879. The power supply 840 may include at least one coil to facilitate inductive charging and data transfer. The accelerometer 1817 is used to determine whether the form factor casing 101 has been tilted to the left or to the right, and provides the results of this determination at decisional operations 1302 and 1303.

The central processor communicates with applications executing within the mobile computing device 110 through the operating system 1820a. In addition, intermediary components, for example, access logic module 1822 provides additional communication channels between the central processor 1820 and operating system 1820a and system components, for example, the display driver 1830. The access logic module 1822 is used to control access to a GUI that is provided as part of the operating system 1820*a*. An example of the access logic module 1822 is the access logic module 805.

It is noted that in one embodiment, central processor 1820 executes logic (e.g., by way of programming, code, or instructions) corresponding to executing applications interfaced through, for example, the display 102. It is noted that numerous other components and variations are possible to the hardware architecture of the mobile computing device 110, thus an embodiment such as shown by FIG. 18 is just illustrative of one implementation for an embodiment.

The radio subsystem 1850 includes a radio processor 1860, a radio memory 1862, and a transceiver 1864. The transceiver 1864 may be two separate components for transmitting and receiving signals or a single component for both transmitting and receiving signals. In either instance, it is referenced as a transceiver 1864. The receiver portion of the transceiver 1864 communicatively couples with a radio signal input of the mobile computing device 110, e.g., an antenna, where communication signals are received from an established call (e.g., a connected or on-going call). The received communication signals include voice (or other sound signals) received from the call and processed by the radio processor 1860 for output through the speaker 120. The transmitter portion of the transceiver 1864 communicatively couples a radio signal output of the device 110, e.g., the antenna, where communication signals are transmitted to an established (e.g., a connected (or coupled) or active) call. The communication signals for transmission include voice, e.g., received through the microphone of the mobile computing device 110, (or other sound signals) that is processed by the radio processor 1860 for transmission through the transmitter of the transceiver 1864 to the established call.

In one embodiment, communications using the described radio communications may be over a voice or data network. Examples of voice networks include GSM communication system, a CDMA system, and UMTS. Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 1850, the basic components shown provide the ability for the mobile computing device to perform radio-frequency communications, including telephonic communications. In an embodiment, many, if not all, of the components under the control of the central processor 1820 are not required by the radio subsystem 1850 when a telephone call is established, e.g., connected or ongoing. The radio processor 1860 may communicate with central processor 1820 using the data line (or bus) 1878.

The card interface 1824 is adapted to communicate, wirelessly or wired, with external accessories (or peripherals), for example, media cards inserted into the expansion slot (not shown). The card interface 1824 transmits data and/or instructions between the central processor and an accessory, e.g., an expansion card or media card coupled within the expansion slot. The card interface 1824 also transmits control signals from the central processor 1820 to the expansion slot to configure the accessory. It is noted that the card interface 1824 is described with respect to an expansion card or media card; it also may be structurally configured to couple with other types of external devices for the device 110, for example, an inductive charging station for the power supply 1840 or a printing device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals including optical and electromagnetic signals. The terms machine-readable medium or computer-readable medium shall be taken to be synonymous.

In the foregoing description, numerous details are set forth to provide an under of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A method for receiving input at a computing device comprising:
   displaying a soft bar and soft icon, the soft bar including a middle position, a first position and a second position that are equal distance from the middle position;
   receiving input indicative of a tilting of the computing device using an accelerometer, the soft icon to traverse the soft bar where tilting occurs;
   granting access to an application residing on the computing device, the access granted based upon a number of times the soft icon intersects at least one of the first position or the second position, to generate a candidate password;
   wherein each intersection to generate a position value that is part of the candidate password, wherein each of the position value is in a form of one character and each of the intersection includes movement of the input from a first pixel position to a second pixel position.

2. The method of claim 1, wherein the input is a signal generated by the computing device, wherein the computing device comprises a touch sensitive display.

3. The method of claim 1, wherein the soft bar is displayed based upon the orientation of a mobile computing device, the display of the soft bar to be one of vertically or horizontally where the mobile computing device is oriented in a vertical or horizontal manner.

4. The method of claim 1, wherein the one character is an American Standard Code for Information Interchange (ASCII) based alpha-numeric character.

5. The method claim 4, wherein the ASCII based alpha-numeric character is an alphabetical character.

6. The method of claim 5, wherein the alphabetical character is either "A" or "B".

7. An apparatus comprising:
   a display to show a soft bar and soft icon, the soft bar including a middle position, a first position and a second position that are equal distance from the middle position;
   an accelerometer to receive input indicative of a tilting of the apparatus, the soft icon to traverse the soft bar where tilting occurs; and
   an access logic module to grant access to an application residing on the apparatus, the access granted based upon a number of times the soft icon intersects at least one of the first position or the second position to generate a candidate password, each intersection to generate a position value that is part of the candidate password, wherein each of the position value is in a form of one character and each of the intersection includes movement of the input from a first pixel position to a second pixel position.

8. The apparatus of claim 7, wherein the first position and the second position are each one of a left position, a right position, up position, and down position.

9. The apparatus of claim 7, wherein the apparatus is a mobile computing device.

10. The apparatus of claim 7, wherein the access logic module stores a password, the password to include position values, each position value generated based upon the number of times the soft icon intersects at least one of the first position or the second position.

11. A non-transitory computer-readable medium having instructions stored thereon for causing a suitably programmed computer to execute a method comprising:
  displaying a soft bar and soft icon, the soft bar including a middle position, a first position and a second position that are equal distance from the middle position;
  receiving input indicative of a tilting of a computing device using an accelerometer, the soft icon to traverse the soft bar where tilting occurs;
  granting access to an application residing on the computing device, the access granted based upon a number of times the soft icon intersects at least one of the first position or the second position, to generate a candidate password;
  wherein each intersection to generate a position value that is part of the candidate password, wherein each of the position value is in a form of one character and each of the intersection includes movement of the input from a first pixel position to a second pixel position.

12. The non-transitory computer-readable medium of claim 11, wherein the input is a signal generated by the computing device, wherein the computing device comprises a touch sensitive display.

13. The non-transitory computer-readable medium of claim 11, wherein the soft bar is displayed based upon the orientation of a mobile computing device, the display of the soft bar to be one of vertically or horizontally where the mobile computing device is oriented in a vertical or horizontal manner.

* * * * *